United States Patent
Yokota et al.

(10) Patent No.: US 11,953,895 B2
(45) Date of Patent: Apr. 9, 2024

(54) FRAUDULENT DIAGNOSTIC MACHINE DETECTION APPARATUS

(71) Applicant: HONDA MOTOR CO., LTD., Tokyo (JP)

(72) Inventors: Tomonori Yokota, Wako (JP); Tatsuro Saito, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 604 days.

(21) Appl. No.: 17/128,627

(22) Filed: Dec. 21, 2020

(65) Prior Publication Data
US 2021/0200199 A1    Jul. 1, 2021

(30) Foreign Application Priority Data

Dec. 25, 2019  (JP) .................... 2019-233716

(51) Int. Cl.
| | | |
|---|---|---|
| *G05B 23/02* | (2006.01) | |
| *G07C 5/00* | (2006.01) | |
| *G07C 5/08* | (2006.01) | |
| *H04L 9/40* | (2022.01) | |

(52) U.S. Cl.
CPC ......... *G05B 23/0262* (2013.01); *G07C 5/008* (2013.01); *G07C 5/0808* (2013.01); *H04L 63/1416* (2013.01); *H04L 63/1441* (2013.01)

(58) Field of Classification Search
CPC .. G05B 23/0262; G07C 5/008; G07C 5/0808; H04L 63/1416; H04L 63/1441
USPC .......................................................... 700/19
See application file for complete search history.

(56) References Cited

U.S. PATENT DOCUMENTS

| | | | | |
|---|---|---|---|---|
| 6,571,136 | B1 * | 5/2003 | Staiger | .................... H04L 63/10 700/47 |
| 6,654,648 | B2 * | 11/2003 | Nada | ...................... B60W 20/11 700/23 |
| 10,102,174 | B2 * | 10/2018 | Berkobin | ............. G07C 5/0808 |
| 10,554,241 | B2 * | 2/2020 | Jain | .................... H04L 12/40013 |

(Continued)

FOREIGN PATENT DOCUMENTS

| | | |
|---|---|---|
| CN | 106990726 A | 7/2017 |
| JP | H08-280069 A | 10/1996 |

(Continued)

OTHER PUBLICATIONS

Office Action dated Apr. 19, 2023 issued over the corresponding Chinese Patent Application No. 202011559455.9 with the English translation thereof.

*Primary Examiner* — Logan M Kraft
*Assistant Examiner* — John D Bailey
(74) *Attorney, Agent, or Firm* — Carrier, Shende & Associates P.C.; Joseph P. Carrier; Jeffrey T. Gedeon

(57) ABSTRACT

A fraudulent diagnostic machine detection apparatus capable of preventing the occurrence of fraudulent processing due to a fraudulent diagnostic machine being connected in parallel with a legitimate diagnostic machine is a fraudulent diagnostic machine detection apparatus comprising node ECUs of a diagnosis target connected to a communication line and a gateway connected between the communication line and a diagnostic machine connection coupler, wherein the gateway detects an electrical circuit change caused by a pin connection of the diagnostic machine connection coupler being branched and the plurality of diagnostic machines being connected in parallel.

4 Claims, 5 Drawing Sheets

(56) References Cited

U.S. PATENT DOCUMENTS

| | | | |
|---|---|---|---|
| 10,652,256 B2* | 5/2020 | Allouche | H04L 63/1441 |
| 10,911,182 B2* | 2/2021 | Kishikawa | B60R 16/023 |
| 11,063,968 B2* | 7/2021 | Inoue | H04L 12/40032 |
| 11,354,406 B2* | 6/2022 | Juliato | G06F 21/554 |
| 2008/0167758 A1* | 7/2008 | Louch | H04L 12/66 |
| | | | 701/2 |
| 2016/0098369 A1* | 4/2016 | Berkobin | G06F 13/4068 |
| | | | 710/106 |
| 2016/0164718 A1* | 6/2016 | Choi | H04L 43/0811 |
| | | | 370/228 |
| 2017/0001649 A1* | 1/2017 | Dickow | B60K 35/00 |
| 2017/0084088 A1* | 3/2017 | Reichardt | G07C 5/008 |
| 2017/0372535 A1* | 12/2017 | Miller | G07C 5/0808 |
| 2018/0069874 A1* | 3/2018 | Saeki | H04L 12/40 |
| 2018/0198846 A1* | 7/2018 | Srinivasan | H04W 4/44 |
| 2018/0284157 A1* | 10/2018 | Inoue | G01F 15/007 |
| 2019/0147668 A1* | 5/2019 | Ravi | G07C 5/008 |
| | | | 701/29.6 |
| 2019/0236856 A1* | 8/2019 | Ishizuka | H04L 67/141 |
| 2019/0279447 A1* | 9/2019 | Ricci | B60R 25/01 |
| 2021/0178996 A1* | 6/2021 | Verma | G06N 20/00 |

FOREIGN PATENT DOCUMENTS

| | | |
|---|---|---|
| JP | 2003-276529 A | 10/2003 |
| JP | 2014-143631 A | 8/2014 |
| JP | 2016-132328 A | 7/2016 |
| JP | 2018-007204 A | 1/2018 |
| WO | 2016/185514 A1 | 11/2016 |

* cited by examiner

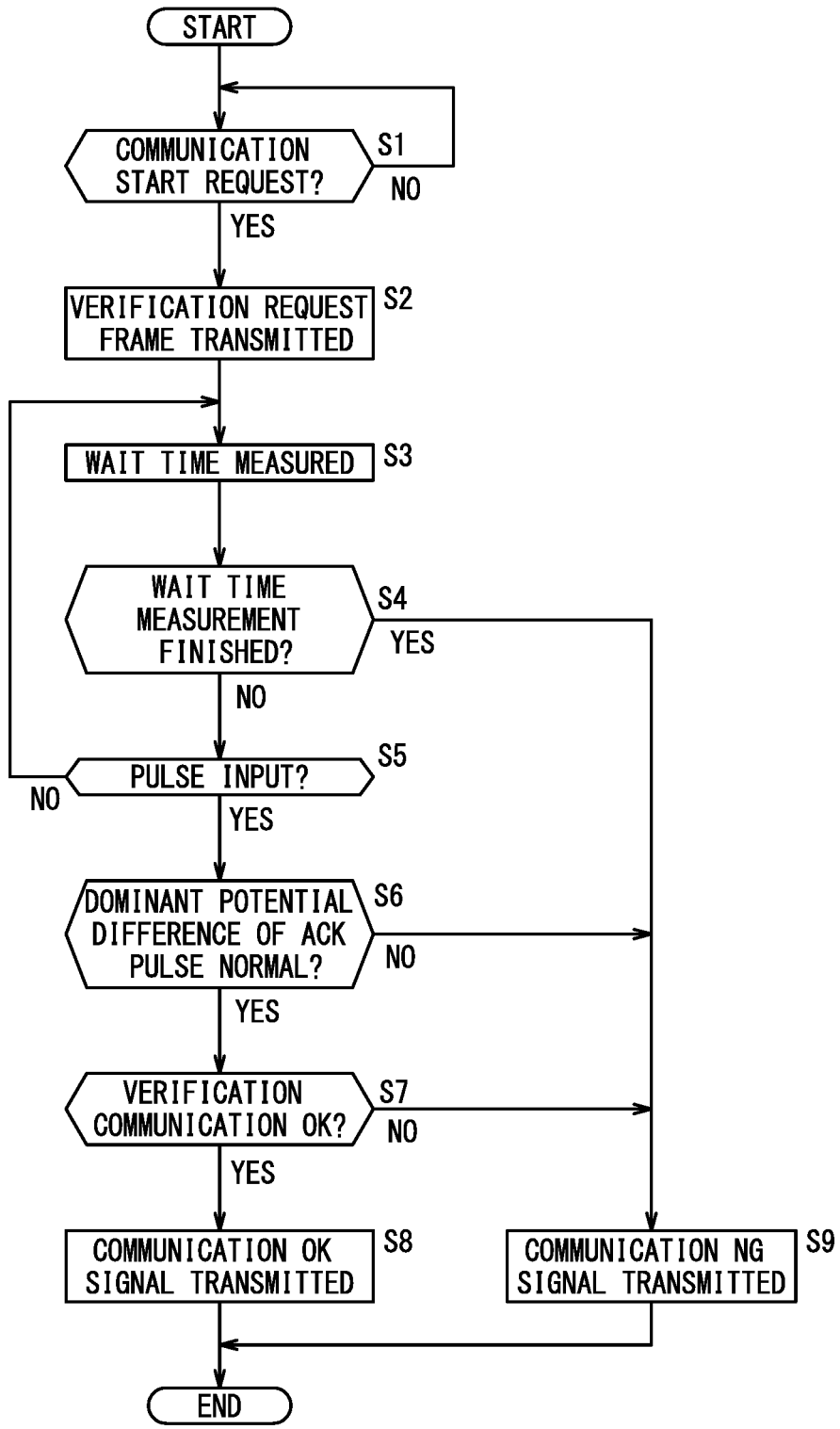

FRAUDULENT DIAGNOSTIC MACHINE DETECTION APPARATUS

CROSS-REFERENCE TO RELATED APPLICATION

This application is based upon and claims the benefit of priority from Japanese Patent Application No. 2019-233716 filed on Dec. 25, 2019, the contents of which are incorporated herein by reference.

BACKGROUND OF THE INVENTION

Field of the Invention

The present invention relates to a detection apparatus for detecting a fraudulent diagnostic machine connected by a wire to a diagnosis target, and in particular to a fraudulent diagnostic machine detection apparatus that detects the connection with the fraudulent diagnostic machine when a legitimate diagnostic machine and a fraudulent diagnostic machine are connected in parallel to the diagnosis target.

Description of the Related Art

International Publication No. WO 2016/185514 (referred to below as WO2016-185514A) discloses technology that creates a short between CAN (Controller Area network) communication lines by having a fraudulent node, provided with a FET switch between the CAN communication lines, set this FET switch to the ON state and causes an attack in which the dominant tampers with the fraudulent recessive ([0027] and FIGS. 6 and 8 of WO2016-185514A).

With the attack detection device disclosed in WO2016-185514A, an A/D converter is provided between the CAN communication lines to detect this attack. WO2016-185514A describes that it is then possible to detect the recessive, which differs from the normal recessive that is a static voltage in the normal state and causes a potential difference, as a fraudulent recessive that has been tampered with by the dominant, according to the output of the A/D converter ([0044] of WO2016-185514A).

SUMMARY OF THE INVENTION

CAN communication lines that are highly resistant to noise and have a simple bus configuration in serial communication are provided inside a vehicle or the like, to provide communication between each node (also referred to as node ECUs) inside the vehicle that includes an ECU (electronic control unit).

In order to collect the data recorded in the node ECUs of this vehicle or to update programs recorded in the node ECUs, one end of a gateway ECU (also referred to as a gateway) provided inside the vehicle is connected to a CAN communication line inside the vehicle and the other end of the gateway is provided with a diagnostic machine connector (DLC: Data Link Coupler or the like) having one end connected thereto.

By connecting a diagnostic machine (legitimate diagnostic machine) to the other end of this DLC from the outside, it is possible to perform processing (legitimate processing) such as collecting data or uploading programs with this diagnostic machine.

In recent years, there have been cases where, with this legitimate diagnostic machine being connected to the DLC, a fraudulent diagnostic machine is connected in parallel to the DLC from the outside and, after the legitimate diagnostic machine has performed verification, fraudulent processing is performed using the fraudulent diagnostic machine.

However, with the attack detection device according to WO2016-185514A, it is impossible to detect fraudulent processing caused by the fraudulent diagnostic machine being connected in parallel with the legitimate diagnostic machine.

The present invention has been devised taking into consideration the aforementioned problem, and has the object of providing a fraudulent diagnostic machine detection apparatus that makes it possible to prevent the occurrence of fraudulent processing due to a fraudulent diagnostic machine being connected in parallel with a legitimate diagnostic machine.

The fraudulent diagnostic machine detection apparatus according to one aspect of the present invention is a fraudulent diagnostic machine detection apparatus including an ECU of a diagnosis target connected to a communication line and a gateway connected between the communication line and a diagnostic machine connection connector (coupler), wherein the gateway detects an electrical circuit change caused by a pin connection of the diagnostic machine connection coupler being branched and a plurality of diagnostic machines being connected in parallel.

According to the present embodiment, since the gateway is configured to detect the electrical circuit change caused by the pin connection of the diagnostic machine connection coupler being branched and the plurality of diagnostic machines being connected in parallel, it is possible to prevent the occurrence of fraudulent processing caused by the fraudulent diagnostic machine being connected in parallel with the legitimate diagnostic machine.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flow chart provided to describe the operation of the fraudulent diagnostic machine detection apparatus according to the present embodiment;

DESCRIPTION OF THE PREFERRED EMBODIMENTS

Preferred embodiments of a fraudulent diagnostic machine detection apparatus according to the present invention will be presented and described below with reference to the accompanying drawings.

EMBODIMENTS

[Configuration]

Figure 1:
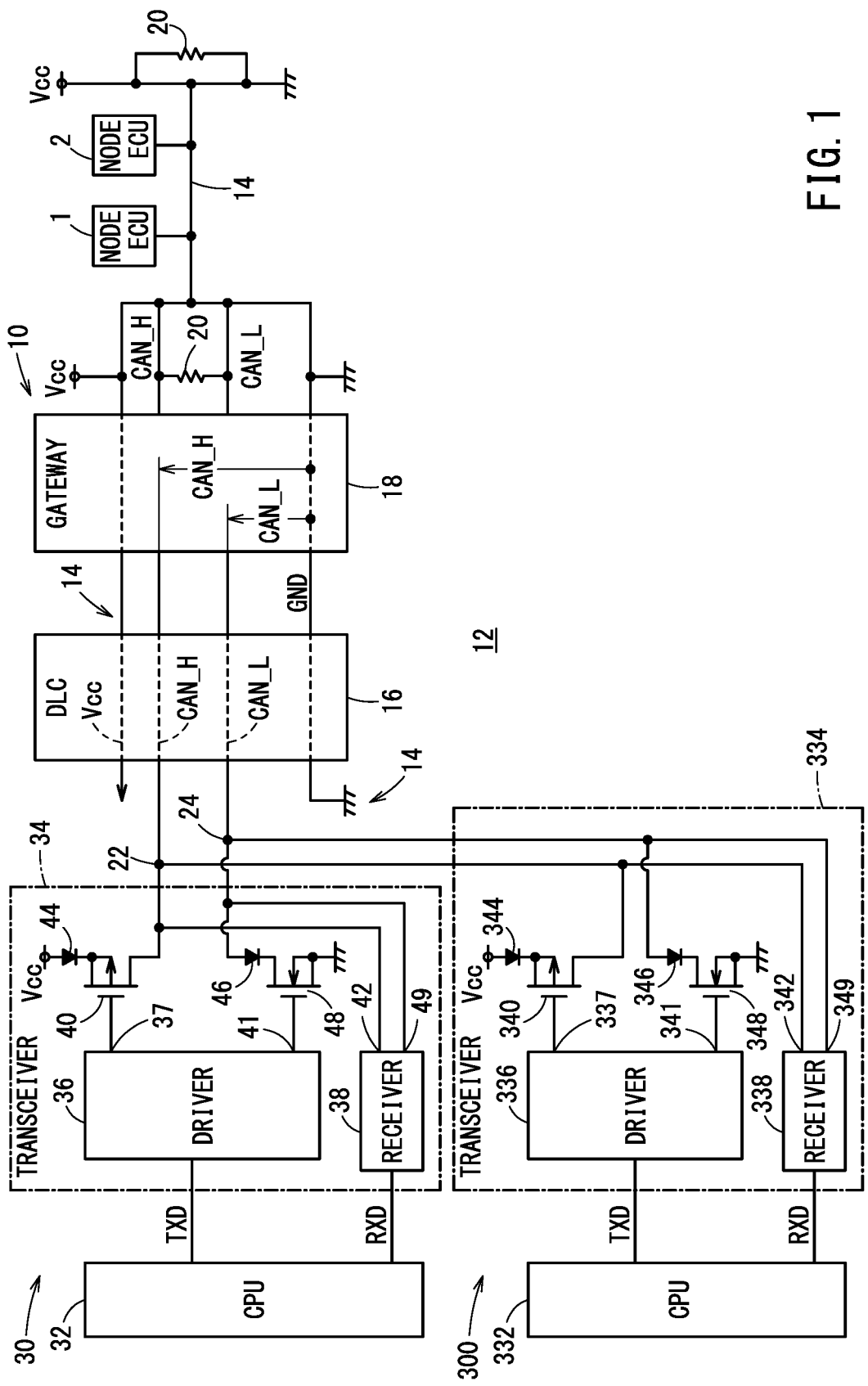
FIG. 1 is a system diagram of an implementation state of a fraudulent diagnostic machine detection apparatus according to the present embodiment.

FIG. 1 is a system diagram showing an implementation state of a fraudulent diagnostic machine detection apparatus 10 according to the present embodiment electrically connected in parallel with a legitimate diagnostic machine 30 and a fraudulent diagnostic machine 300 to a diagnostic machine connection coupler (DLC: Data Link Coupler or simply "coupler") 16 provided in a vehicle 12.

The fraudulent diagnostic machine detection apparatus 10 is loaded in the vehicle 12, which is an automobile or the like. The fraudulent diagnostic machine detection apparatus 10 includes at least two node ECUs, i.e. a node ECU 1 and a node ECU 2, which are diagnosis targets to be connected to a communication line 14 that is a CAN (Controller Area Network) implemented within the vehicle 12, and a gateway (gateway ECU) 18 connected between the communication line 14 and a coupler 16.

In this Specification, "ECU" is an abbreviation for an "Electronic Control Unit" that is a calculator, including a microcomputer, and also includes a CPU (Central Processing Unit), a ROM (including an EEPROM) that is a storage apparatus, a RAM (Random Access Memory), an input/output apparatus such as an A/D converter and D/A converter, and a timer such as a time measuring section, and the like, and functions as various function realizing sections (function realizing means), e.g. a control section, a computing section, a processing section, and the like by having the CPU read and execute a program stored in the ROM.

The communication line 14 includes a power source Vcc, a ground GND, a bus CAN_H, and a bus CAN_L. A terminal resistor 20 is connected to the communication line 14 inside the vehicle 12, between the bus CAN_H and the bus CAN_L at both ends.

Figure 2:
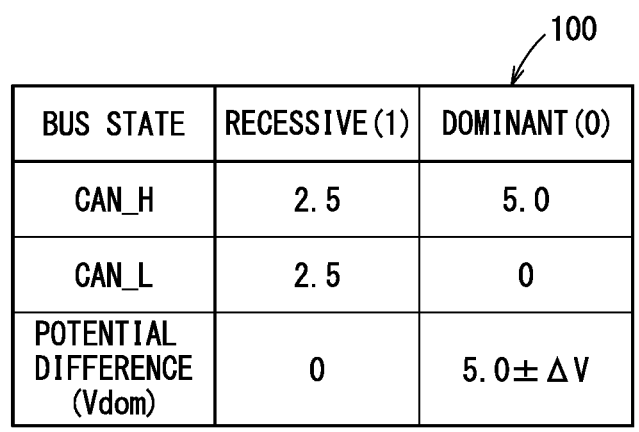
FIG. 2 is a table showing signal level in a normal state of a physical layer of a CAN, which is the communication network implemented in the present embodiment.

FIG. 2 shows a table 100 of the signal level {voltage V (volts)} in a normal state of a physical layer of the CAN, which is the communication network implemented in the present embodiment.

Essentially, this table 100 shows that when the bus state is recessive (1), the bus CAN_H and the bus CAN_L are both at 2.5 [V] and the potential difference is 0 [V]. On the other hand, the table 100 shows that when the bus state is dominant (0), the bus CAN_H is at 5.0 [V] and the bus CAN_L is at 0 [V], so that the potential difference is 5.0[V]±ΔV=(voltage median value of dominant pulse Pack±error voltage)=(Vdom median value±ΔV).

Here, ΔV is an error voltage that is a relatively small predetermined value within the specifications, and can be set by the gateway 18 according to the measured value of the power supply Vcc or the like of each vehicle 12.

As shown in FIG. 1, the gateway 18 measures the voltage of the bus CAN_L and the voltage of the bus CAN_H, and calculates the potential difference (bus CAN_H voltage−bus CAN_L voltage).

In FIG. 1, the coupler 16 (also referred to as a diagnostic connector) has a shape and pin arrangement in accordance with a predetermined standard.

The legitimate diagnostic machine (ECU) 30 includes a CPU 32 and a transceiver 34. The fraudulent diagnostic machine (ECU) 300 also includes a CPU 332 and a transceiver 334, in the same manner.

The transceiver 34 includes a driver 36 and a receiver 38, transmission data TXD is input from the CPU 32 to the driver 36, and reception data RXD is output from the receiver 38 to the CPU 32.

In the same manner, the transceiver 334 includes a driver 336 and a receiver 338, transmission data TXD is input from the CPU 332 to the driver 336, and reception data RXD is output from the receiver 338 to the CPU 332.

The wire connected to the pin of the bus CAN_H of the diagnostic machine connection coupler 16 branches at a branch point 22.

One of the branched wires is connected to a drain terminal of a PMOSFET (high-side output transistor) 40 of the transceiver 34 of the legitimate diagnostic machine 30 and to an input terminal 42 of the bus CAN_H of the receiver 38. A gate terminal of the PMOSFET 40 is connected to a gate drive terminal 37 of the driver 36, and a source terminal of the PMOSFET 40 is connected to the power source Vcc through a diode 44 connected in a forward direction.

The other wire branching from the branch point 22 is connected to a drain terminal of a PMOSFET 340 of the transceiver 334 of the fraudulent diagnostic machine 300 and to an input terminal 342 of the bus CAN_H of the receiver 338. The gate terminal of the PMOSFET 340 is connected to a gate drive terminal 337 of the driver 336, and a source terminal of the PMOSFET 340 is connected to the power source Vcc through a diode 344 connected in a forward direction.

The wire connected to the pin of the bus CAN_L of the diagnostic machine connection coupler 16 branches at a branch point 24.

One of the branched wires is connected to a drain terminal of an NMOSFET (low-side output transistor) 48 through a diode 46 connected in the forward direction, in the legitimate diagnostic machine 30, and to a CAN_L input terminal 49 of the receiver 38. A source terminal of the NMOSFET 48 is grounded, and a gate terminal of the NMOSFET 48 is connected to a gate drive terminal 41 of the driver 36.

The other wire branching from the branch point 24 is connected to a drain terminal of an NMOSFET (low-side output transistor) 348 through a diode 346 connected in the forward direction, in the fraudulent diagnostic machine 300, and to a CAN_L input terminal 349 of the receiver 338. The source terminal of the NMOSFET 348 is grounded, and the gate terminal of the NMOSFET 348 is connected to a gate drive terminal 341 of the driver 336.

[Operation]

The following is a detailed description of an operation of the fraudulent diagnostic machine detection apparatus 10 according to the present embodiment, which is basically configured in the manner described above, having the legitimate diagnostic machine 30 and the fraudulent diagnostic machine 300 electrically connected in parallel to the coupler 16, based on the flow chart shown in FIG. 3. Unless specified otherwise, the CPU of the gateway 18 is the object executing the processing shown in the flow chart, but since mentioning this every time would make things complicated, it is only mentioned when necessary.

When detecting the fraudulent diagnostic machine 300, a two-stage verification process is performed. Here, in the two-stage verification process, the first stage is a simple verification confirmation realized by handshake communication (a so-called ACK verification in which the return of an acknowledgement signal concerning whether synchronization processing is possible is confirmed through a CAN communication procedure. The second stage is a full-scale verification confirmation realized by a challenge response method, for example. The verification confirmation of the second stage is performed only by the legitimate diagnostic machine 30, and therefore, in the present embodiment, the parallel connection of the fraudulent diagnostic machine 300 is detected at the point of the simple verification confirmation of the first stage.

At step S1, the gateway 18 judges whether a communication start request frame (data frame) has been received from the legitimate diagnostic machine 30.

When the communication start request frame has been received (step S1: YES), at step S2, the gateway 18 transmits a verification request frame 50 (FIG. 4A) to the legitimate diagnostic machine 30 in order to verify the legitimate diagnostic machine 30.

Furthermore, at this time, at step S3, the gateway 18 starts measuring a wait time Tw, which is a predetermined time needed for the verification request, using a timer (time measurement apparatus), and continues measuring time from when the time measurement starts.

Furthermore, at step S4, a check is made concerning whether the measurement of the wait time Tw has ended.

Immediately after step S2, the CPU 32 of the legitimate diagnostic machine 30 receives the verification request frame 50, as the reception data RXD, via the receiver 38 of the transceiver 34, from the gateway 18 through the coupler 16.

The verification request frame 50 is received from the same timing t1 by the fraudulent diagnostic machine 300 as well.

Figure 4A:
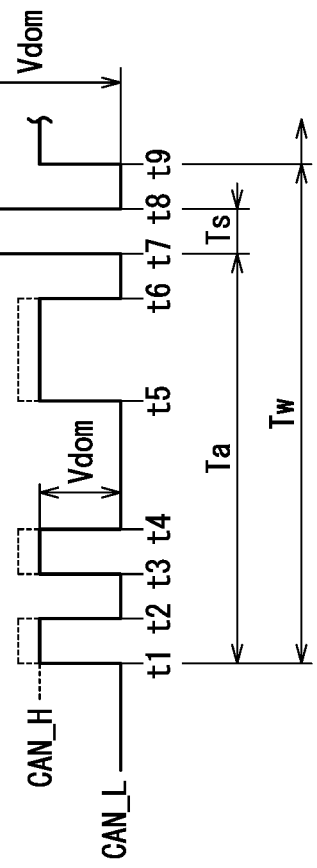
FIG. 4A is a waveform diagram showing a pulse sequence of a verification request frame.

FIG. 4A shows a pulse sequence of the verification request frame 50 (in which timings t1 to t6 are the simple verification stage and the timings from t7 onward are the full-scale verification after the simple verification is OK).

The content of the verification request frame 50 includes instructions for transmitting, from the timing t7 to the timing t8, a dominant pulse Pack (FIG. 4B) that is a confirmation pulse (confirmation signal) with a pulse width Ts starting after a prescribed time Ta has passed from the timing t1 or after a prescribed time has passed from the timing t6.

At step S5, the gateway 18 checks whether there is input of a pulse (or pulse sequence) in response to the verification request frame 50.

When input of a pulse within the wait time Tw has been confirmed in step S5 (step S5: YES), at step S6, a check is made concerning whether the dominant level of the pulse (or pulse sequence) is normal (legitimate) or not (abnormal, fraudulent).

Figure 4B:
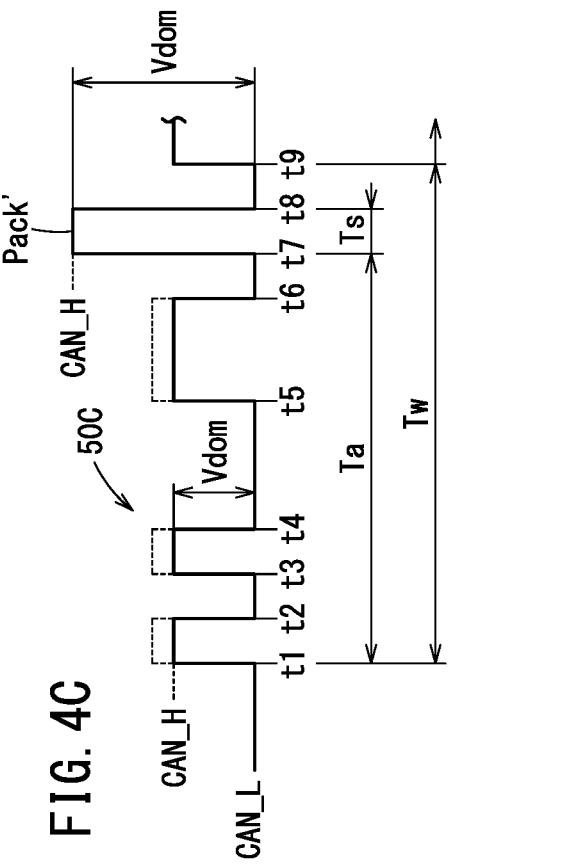
FIG. 4B is a waveform diagram showing a pulse sequence of a verification request frame when only the legitimate diagnostic machine is connected to the coupler.

FIG. 4B shows a verification request frame 50A (composite frame including the verification request frame 50 and the dominant pulse Pack) that is a pulse sequence where a legitimate dominant pulse (confirmation pulse or ACK pulse) Pack is embedded in the verification request frame 50 in a state where only one legitimate diagnostic machine 30 is connected to the coupler 16. The legitimate dominant pulse Pack is observed (measured) by the gateway 18 when the transmission data TXD from the CPU 32 is sent through the coupler 16 via the driver 36.

The gateway 18 measures the voltage of the bus CAN_L and the voltage of the bus CAN_H of the dominant pulse Pack, and calculates a potential difference Vdom (bus CAN_H voltage−bus CAN_L voltage).

A judgment is made concerning whether the calculated potential difference Vdom of the dominant pulse Pack is a voltage value within an error range (Vdom median value±ΔV), and if it is a voltage value within the error range (step S6: YES), from the timing t9 onward, at step S7, the full-scale verification communication described above is performed, and if this verification ends in success, at step S8, the gateway 18 transmits a communication OK signal to the legitimate diagnostic machine 30.

In this way, it is possible for the verification of the legitimate diagnostic machine 30 to be successfully completed and for the diagnosis of the node ECU1 and the node ECU2 of the diagnosis target to be performed by the legitimate diagnostic machine 30. In this diagnosis, it is possible to collect the data recorded in the node ECU1 and the node ECU2 or to update programs recorded in the node ECU1 and the node ECU2, for example.

Figure 4C:
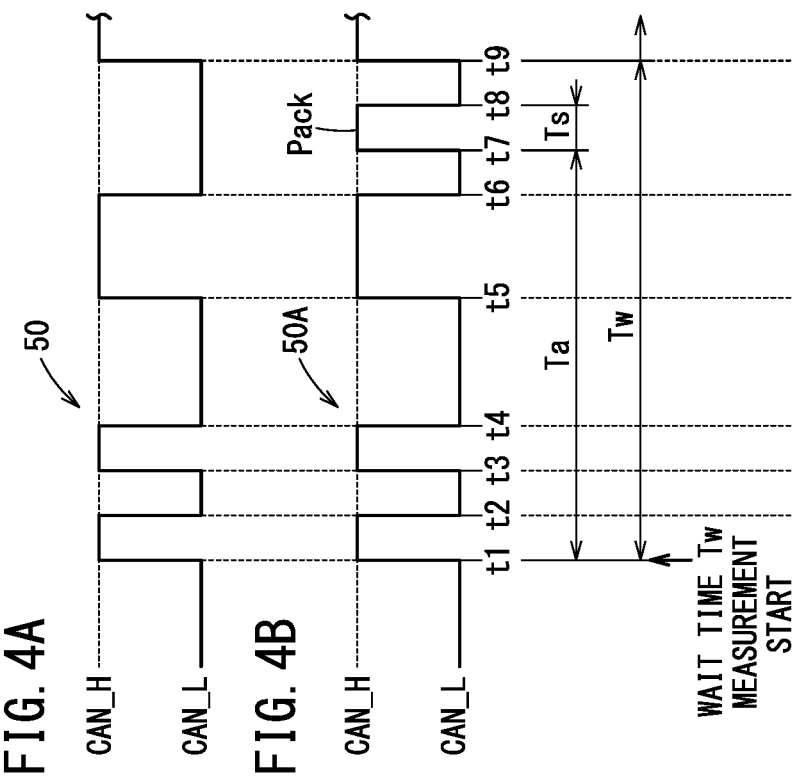
FIG. 4C is a waveform diagram showing a pulse sequence of a verification request frame when the legitimate diagnostic machine and a fraudulent diagnostic machine are connected in parallel to the coupler.

FIG. 4C shows a waveform in a fraudulent state where the verification of step S6 cannot be performed.

In other words, FIG. 4C shows the waveform of a verification request frame 50C that is a pulse sequence where a fraudulent dominant pulse superimposed on a legitimate dominant pulse (confirmation pulse or ACK pulse) Pack is embedded in the verification request frame 50 in a state where the legitimate diagnostic machine 30 and the fraudulent diagnostic machine 300 are connected to the coupler 16. The legitimate dominant pulse Pack is observed (measured) by the gateway 18 when the transmission data TXD from the CPU 32 is sent through the coupler 16 via the driver 36, and the fraudulent dominant pulse is observed (measured) by the gateway 18 when the transmission data TXD from the CPU 332 is sent through the coupler 16 via the driver 336.

The verification request frame 50C includes a composite waveform that is a combination of the verification request frame 50 and a dominant pulse Pack' (the pulse in which the fraudulent dominant pulse is superimposed on the dominant pulse Pack). The bus CAN_H voltage between the timings t1 and t2 and the like is a voltage that is lower than the bus CAN_H voltage in a case where only the legitimate diagnostic machine 30 shown in FIG. 4B is connected. The reason for this is described further below in the [Modifications] section. In the example of FIG. 4C, the bus CAN_H voltage between the timings t7 and t8 caused by the parallel connection of the fraudulent diagnostic machine 300 is the detection target.

In this case, at step S6, the gateway 18 measures the bus CAN_L voltage and the bus CAN_H voltage of the dominant pulse Pack', and calculates the potential difference Vdom (bus CAN_H voltage−bus CAN_L voltage).

It is judged that the calculated potential difference Vdom of the dominant pulse Pack' is a voltage value outside the error range {Vdom>(Vdom legitimate median value+ΔV)} (step S6: NO). The Vdom legitimate median value is also referred to as Vdomr in the description below.

Due to this voltage value measurement result, the gateway 18 judges that the fraudulent diagnostic machine 300 is connected simultaneously in parallel with the legitimate diagnostic machine 30 and, at step S9, notifies an ECU handling security of the vehicle 12, e.g. the node ECU1, that the fraudulent diagnostic machine 300 is connected.

The node ECU1 that has received this notification causes an ECU for display, e.g., the node ECU2, to display in the display of the vehicle 12 information indicating that the fraudulent diagnostic machine 300 is connected, and causes the node ECU2 to notify a server and dealer through the communication device of the vehicle 12 that the fraudulent diagnostic machine 300 is connected.

If no pulses are input within the wait time Tw, the judgment of step S4 is affirmative (step S4: YES), and at step S9, a communication NG signal indicating that communication could not be started due to the verification time being exceeded is transmitted to the node ECU1.

[Modifications]

The embodiment described above can also be modified in the manner described below.

Figure 5:
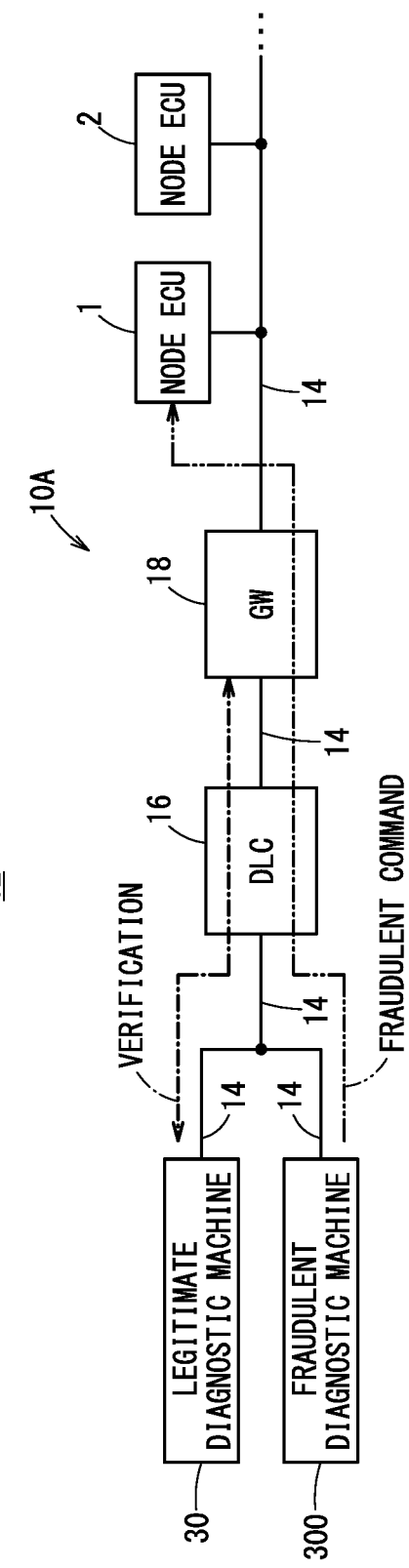
FIG. 5 is a system diagram of an implementation state of a fraudulent diagnostic machine detection apparatus according to the modification.

FIG. 5 is a system diagram showing an implementation state of a fraudulent diagnostic machine detection apparatus 10A according to a modification. In FIG. 5, configurations and processes identical to those of the embodiment described above (see FIGS. 1 and 3) are given the same reference numerals, and only differing portions are described.

Figure 4D:
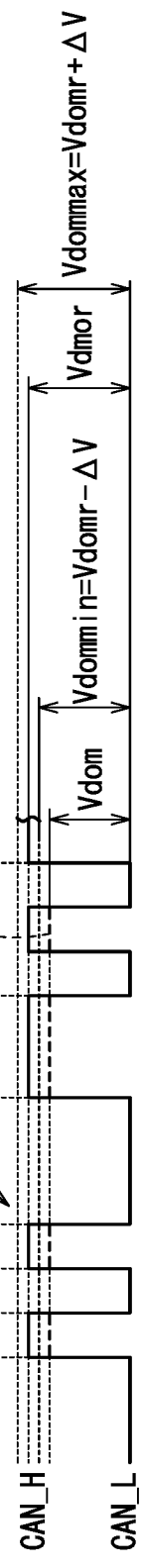
FIG. 4D is a waveform diagram showing the pulse sequence of a verification frame provided for describing a modification.

FIG. 4D is a waveform diagram provided to describe the operation of the fraudulent diagnostic machine detection apparatus 10A according to the modification (the fraudulent diagnostic machine detection program of the gateway 18 is different from that of FIG. 1).

In this case, at step S6, the gateway 18 judges whether the potential difference Vdom of a dominant pulse Pack" is a voltage value greater than or equal to the minimum tolerable potential difference Vdommin of the normal (legitimate median value of) the potential difference Vdomr (Vdom≥Vdommin=Vdomr−ΔV).

When the fraudulent diagnostic machine 300 is simultaneously connected in parallel with the legitimate diagnostic machine 30, the impedance between the bus CAN_H and the bus CAN_L is lower than in a state where only the one legitimate diagnostic machine 30 is connected, and therefore the potential difference Vdom of the dominant pulse Pack" becomes a voltage value that is less than the minimum tolerable potential difference Vdommin.

Accordingly, the potential difference judgment of step S6 is negative, and at step S9, the communication NG signal is transmitted from the gateway 18.

In this modification, in the same manner as in the embodiment, it is possible to detect the parallel connection state of the fraudulent diagnostic machine 300 when the fraudulent diagnostic machine 300 does not transmit the legitimate dominant pulse Pack.

In other words, as shown in FIG. 5, the fraudulent diagnostic machine detection apparatus 10A according to this modification can detect the parallel connection of the fraudulent diagnostic machine 300 after the verification shown by the one-dot chain line has been performed by the legitimate diagnostic machine 30 (step S7: YES) and before the fraudulent command shown by the two-dot chain line is transmitted by the fraudulent diagnostic machine 300.

A maximum tolerable potential difference Vdommax is set to be Vdommax=Vdomr+ΔV.

The recessive potential may be measured instead of measuring the potential difference Vdom of the dominant pulse Pack", but by measuring the potential difference Vdom of the dominant pulse Pack" it is possible to reduce the effect of the offset {constant voltage drop caused by the decrease of the impedance (resistance value)} and to more accurately detect the decrease of the potential difference based on the decrease of the impedance caused by the parallel connection of the fraudulent diagnostic machine 300.

Invention Understandable from the Embodiment and Modifications

The invention that can be understood from the embodiment and modifications described above will be mentioned.

In order to facilitate understanding, the reference numerals used in the above description (of the embodiment and modification) are used, but these configurational elements are not limited to those given the reference numerals.

The fraudulent diagnostic machine detection apparatus according to the present embodiment is the fraudulent diagnostic machine detection apparatus 10 including the ECU 1 (and 2) of a diagnosis target connected to a communication line 14 and the gateway 18 connected between the communication line 14 and the diagnostic machine connection coupler 16, wherein the gateway 18 detects an electrical circuit change caused by a pin connection of the diagnostic machine connection coupler 16 being branched and the plurality of diagnostic machines 30 and 300 being connected in parallel.

In this way, since the gateway 18 is configured to detect electrical circuit change caused by the pin connection of the diagnostic machine connection coupler 16 being branched and the plurality of diagnostic machines 30 and 300 being connected in parallel, it is possible to prevent the occurrence of fraudulent processing caused by the fraudulent diagnostic machine 300 being connected in parallel with the legitimate diagnostic machine 30.

Furthermore, in the fraudulent diagnostic machine detection apparatus 10, the electrical circuit change may be a voltage change of the potential difference Vdom of a dominant in CAN communication.

Due to this, the impedance seen on the diagnostic machine (legitimate diagnostic machine 30 and fraudulent diagnostic machine 300) side from the gateway 18 changes due to the fraudulent diagnostic machine 300 being connected in parallel with the legitimate diagnostic machine 30, and based on the change of this impedance, it is possible to judge that the fraudulent diagnostic machine 300 is connected in parallel from the voltage change of the potential difference Vdom of the dominant voltage. The potential difference Vdom (bus CAN_H voltage−bus CAN_L voltage) of the dominant voltage is double the recessive voltage, and therefore the effect of the offset is small and it is possible to improve the measurement accuracy.

Furthermore, in the fraudulent diagnostic machine detection apparatus 10, the gateway 18 may, in response to a communication start request transmitted from the diagnostic machine 30 (and 300), transmit a verification request to the diagnostic machine 30 (and 300) and prompt the diagnostic machine 30 (and 300) to transmit the dominant pulse Pack at a prescribed timing (Ta, Ts), as a verification signal.

Due to this, the dominant pulse Pack that is a confirmation signal in which the dominant pulse Pack is embedded at the prescribed timing (Ta, Ts) is transmitted from the diagnostic machines 30 and 300 in response to the verification request from the gateway 18. Therefore, the gateway 18 can detect the parallel connection of the fraudulent diagnostic machine 300 by checking whether the dormant pulse Pack at the prescribed timing (Ta, Ts) is present.

Furthermore, in the fraudulent diagnostic machine detection apparatus 10, the gateway 18 may detect the fraudulent diagnostic machine 300 based on the potential difference Vdom of the dominant pulse Pack that is embedded in the verification signal, which is a reception signal.

Due to this, even in a case where the fraudulent diagnostic machine 300 is connected in parallel while trying to use the verification function of the legitimate diagnostic machine 30, it is possible to detect the fraudulent diagnostic machine 300 based on the potential difference Vdom of the dominant pulse Pack generated at the prescribed timing (Ta, Ts).

The present invention is not limited to the embodiment described above, and it is obvious that various configurations can be adopted based on the content of the Specification, such as applying the present invention to a communication system other than CAN.

What is claimed is:

1. A fraudulent diagnostic machine detection apparatus comprising an ECU of a diagnosis target connected to a CAN communication line and a gateway connected between the CAN communication line and a diagnostic machine connection coupler,
wherein the gateway detects a change in a potential difference of a dominant pulse having been transmitted from a plurality of diagnostic machines and inputted to the CAN communication line, in a state where a pin connection of the diagnostic machine connection coupler is branched and the plurality of diagnostic machines are connected in parallel.

2. The fraudulent diagnostic machine detection apparatus according to claim 1, wherein the gateway, in response to a communication start request transmitted from the diagnostic machines, transmits a verification request to the diagnostic machines and prompts the diagnostic machines to transmit a dominant pulse at a prescribed timing, as a verification signal.

3. The fraudulent diagnostic machine detection apparatus according to claim 2, wherein the gateway detects a fraudulent diagnostic machine among the plurality of diagnostic machines based on the potential difference of the dominant pulse that is embedded in the verification signal, which is a reception signal.

4. The fraudulent diagnostic machine detection apparatus according to claim 3, wherein the gateway determines that the plurality of diagnostic machines connected in parallel includes the fraudulent diagnostic machine in a case where the potential difference of the dominant pulse is less than a minimum tolerable potential difference.

* * * * *